(12) United States Patent
Ports et al.

(10) Patent No.: US 9,683,589 B2
(45) Date of Patent: Jun. 20, 2017

(54) SHELF DISPLAY

(71) Applicant: One Source Industries, LLC, Irvine, CA (US)

(72) Inventors: Richard Allen Ports, San Clemente, CA (US); Jason Rockford Wheaton, Cerritos, CA (US)

(73) Assignee: One Source Industries, LLC, Irvine, CA (US)

( * ) Notice: Subject to any disclaimer, the term of this patent is extended or adjusted under 35 U.S.C. 154(b) by 0 days.

(21) Appl. No.: 15/057,278

(22) Filed: Mar. 1, 2016

(65) Prior Publication Data
US 2016/0180750 A1 Jun. 23, 2016

Related U.S. Application Data

(63) Continuation-in-part of application No. 14/710,890, filed on May 13, 2015.
(Continued)

(51) Int. Cl.
| | |
|---|---|
| *F16B 1/00* | (2006.01) |
| *A47F 5/00* | (2006.01) |
| *G09F 13/18* | (2006.01) |
| *G09F 3/20* | (2006.01) |
| *G09F 7/18* | (2006.01) |

(Continued)

(52) U.S. Cl.
CPC .............. *F16B 1/00* (2013.01); *A47F 5/0068* (2013.01); *G09F 3/204* (2013.01); *G09F 7/18* (2013.01); *G09F 13/18* (2013.01); *F16B 2001/0035* (2013.01); *F16C 11/0604* (2013.01); *F16C 11/0657* (2013.01); *F16C 11/0695* (2013.01); *F16M 11/14* (2013.01); *F16M 11/24* (2013.01); *F16M 13/022* (2013.01); *G09F 2007/1843* (2013.01); *G09F 2007/1852* (2013.01); *G09F 2007/1856* (2013.01); *G09F 2013/1845* (2013.01); *G09F 2013/1881* (2013.01); *G09F 2013/222* (2013.01)

(58) Field of Classification Search
CPC .... G09F 7/20; G09F 3/204; G09F 2007/1843; G09F 2007/1856; G09F 7/18; A47F 5/0068; A47F 5/0043; A47F 5/0823
See application file for complete search history.

(56) References Cited

U.S. PATENT DOCUMENTS

| | | | | |
|---|---|---|---|---|
| 1,253,847 | A | * 1/1918 | Lynch | ....................... G09F 7/18 |
| | | | | 211/182 |
| 2,182,275 | A | * 12/1939 | Blonkvist | ................ B60R 1/12 |
| | | | | 359/838 |

(Continued)

*Primary Examiner* — Gary C Hoge
(74) *Attorney, Agent, or Firm* — Patti & Malvone Law Group, LLC

(57) ABSTRACT

A shelf display that is easily attached to a store merchandising fixture in a retail or wholesale environment is disclosed. It extends away from the merchandising fixture to increase visibility. The shelf display includes separate pieces that can be snapped together without the use of tools and provide flexibility in positioning the shelf display. A frame is mounted into a clip that slides along one edge of the frame. The clip is part of a ball joint so that the frame can be rotated or tilted. The ball joint attaches to an arm with breakaway lines so the length of the arm can be adjusted. The display may be formed in multiple sizes and shapes, and is oriented so that both sides of the shelf display can be used for graphic statements.

14 Claims, 15 Drawing Sheets

Related U.S. Application Data

(60) Provisional application No. 61/996,682, filed on May 14, 2014.

(51) Int. Cl.

| | |
|---|---|
| *F16M 13/02* | (2006.01) |
| *F16C 11/06* | (2006.01) |
| *G09F 13/22* | (2006.01) |
| *F16M 11/14* | (2006.01) |
| *F16M 11/24* | (2006.01) |

(56) References Cited

U.S. PATENT DOCUMENTS

| | | | | |
|---|---|---|---|---|
| 5,058,300 A | * | 10/1991 | Ernest | G09F 7/18 40/606.18 |
| 5,566,030 A | * | 10/1996 | Yue | A45D 42/00 248/467 |
| 5,911,523 A | * | 6/1999 | Burchart | G09F 7/20 248/414 |
| 6,163,997 A | * | 12/2000 | Deralas | A47G 1/06 40/593 |
| 6,739,567 B1 | * | 5/2004 | Curtis | E01F 9/677 248/519 |
| 2004/0200793 A1 | * | 10/2004 | Hardy | G09F 3/204 211/119.003 |
| 2004/0221501 A1 | * | 11/2004 | Schaak | A47G 1/143 40/747 |
| 2005/0044765 A1 | * | 3/2005 | Ahlund | G09F 3/204 40/649 |
| 2010/0031546 A1 | * | 2/2010 | Nwatu | G09F 15/0062 40/607.1 |
| 2010/0200525 A1 | * | 8/2010 | Keyvanloo | A47B 96/07 211/59.2 |
| 2011/0277363 A1 | * | 11/2011 | Dukes | G09F 7/18 40/606.01 |
| 2012/0036751 A1 | * | 2/2012 | Wang | G09F 7/04 40/600 |
| 2012/0312944 A1 | * | 12/2012 | Anderson | G09F 3/204 248/222.14 |

* cited by examiner

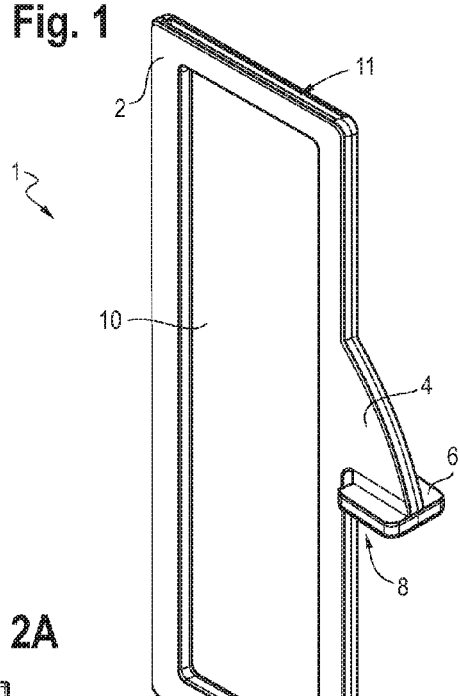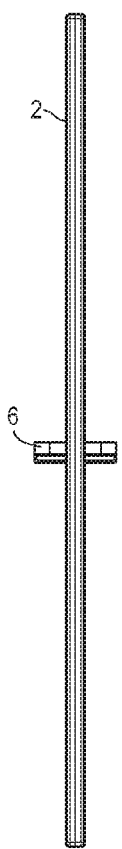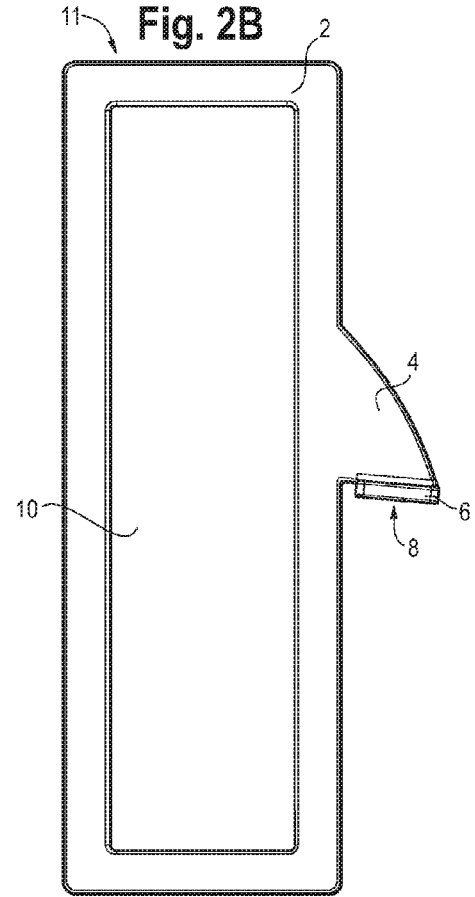

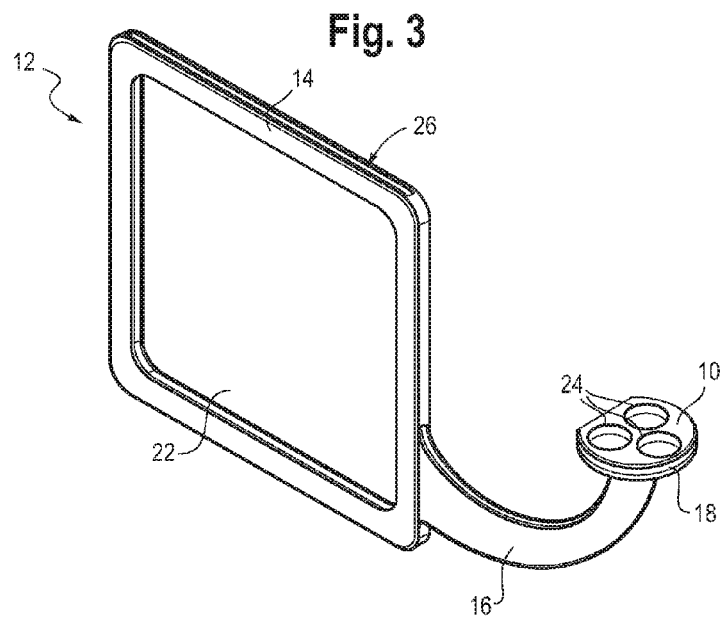
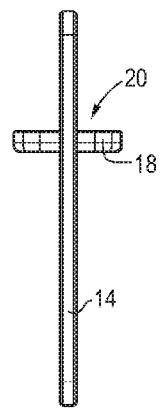
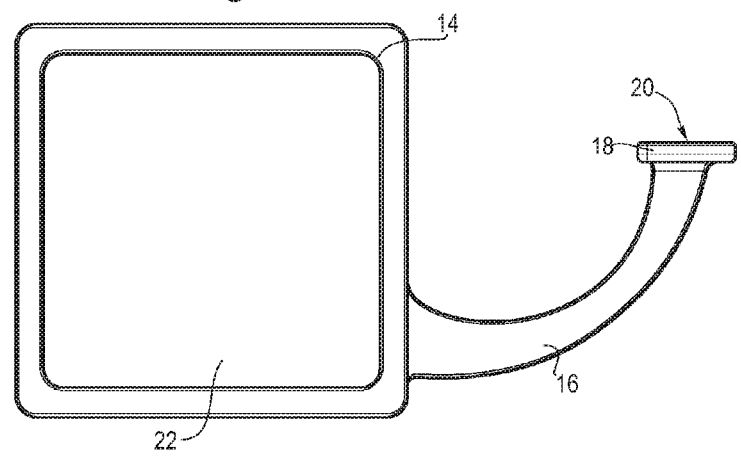

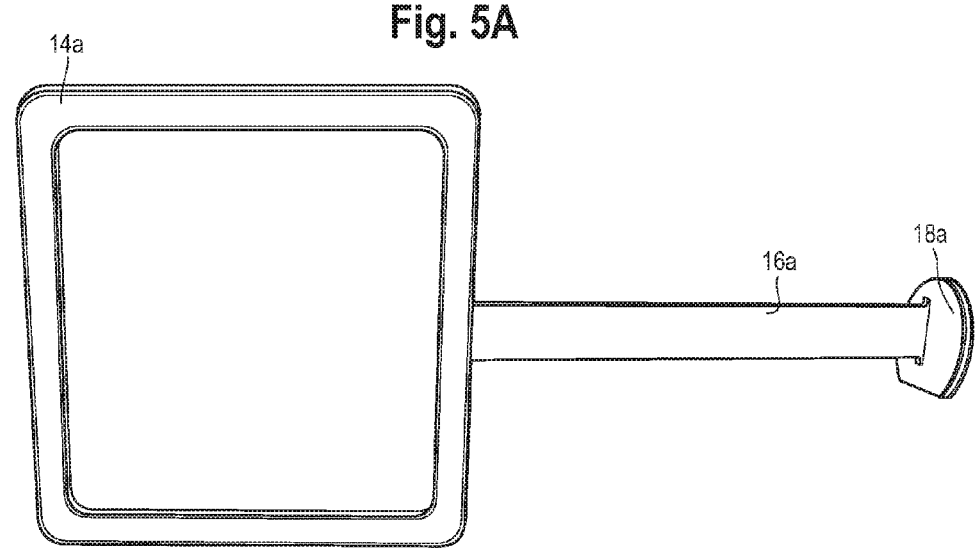
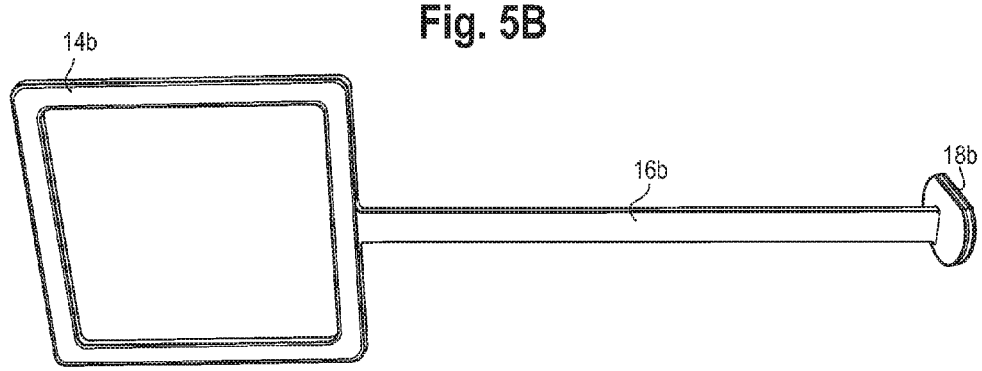

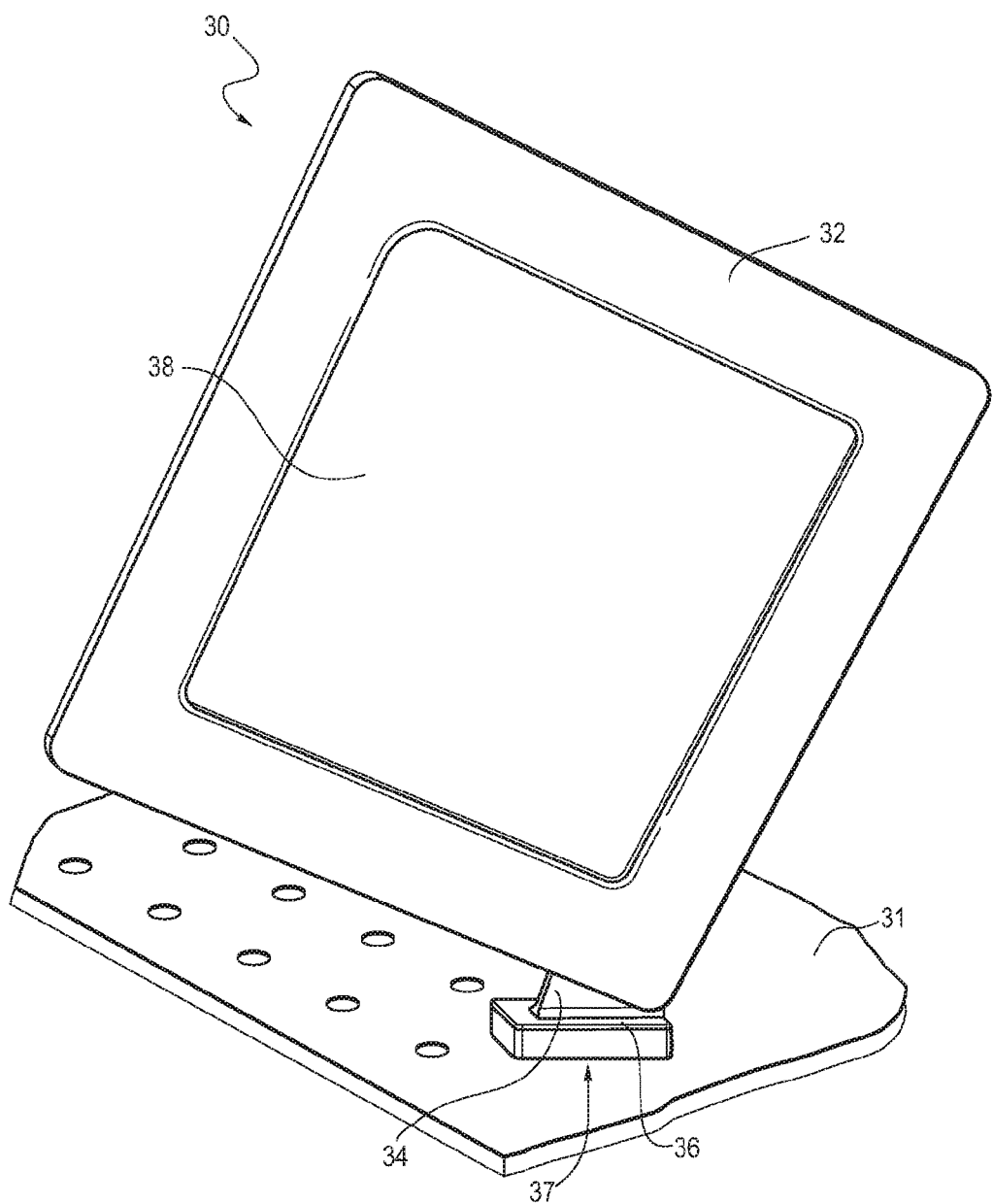

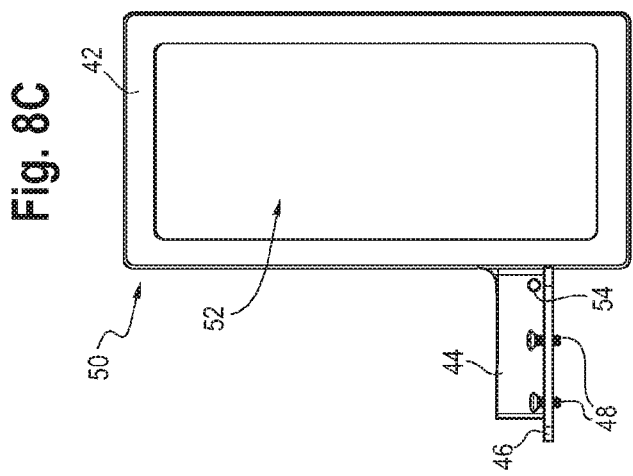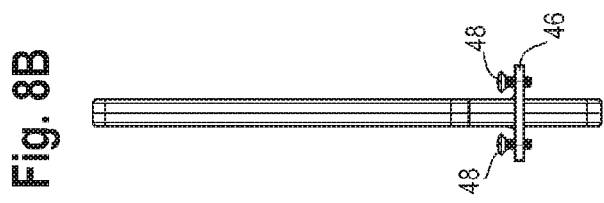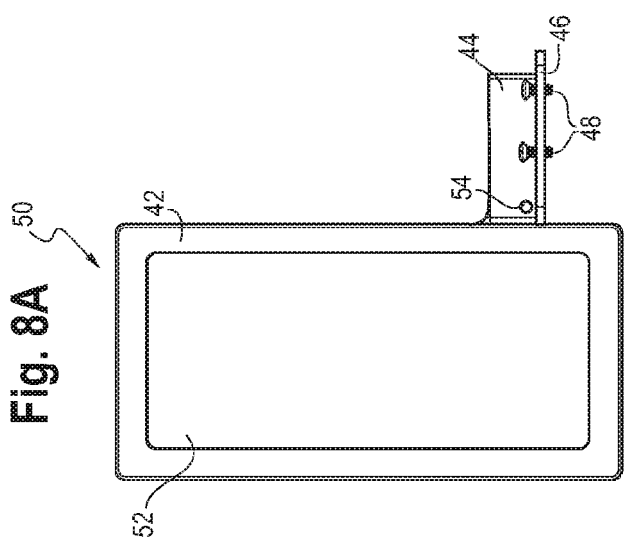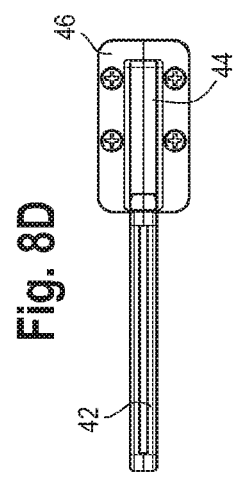

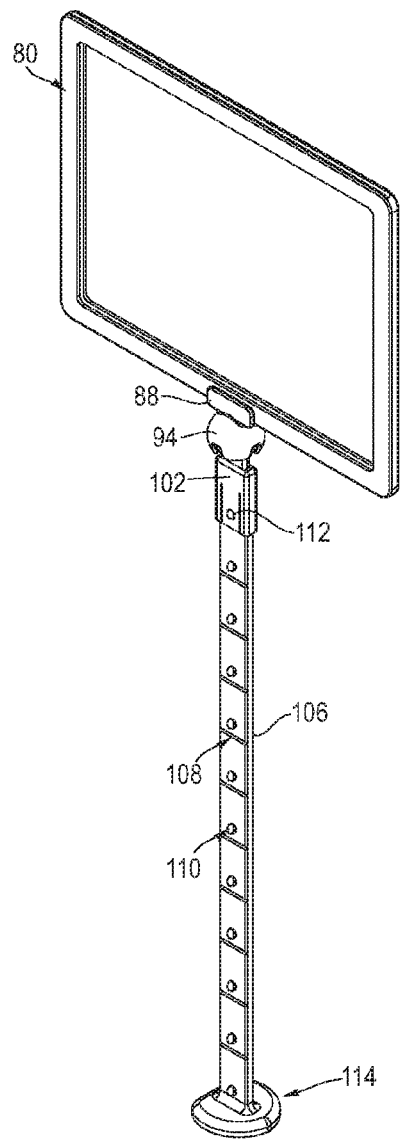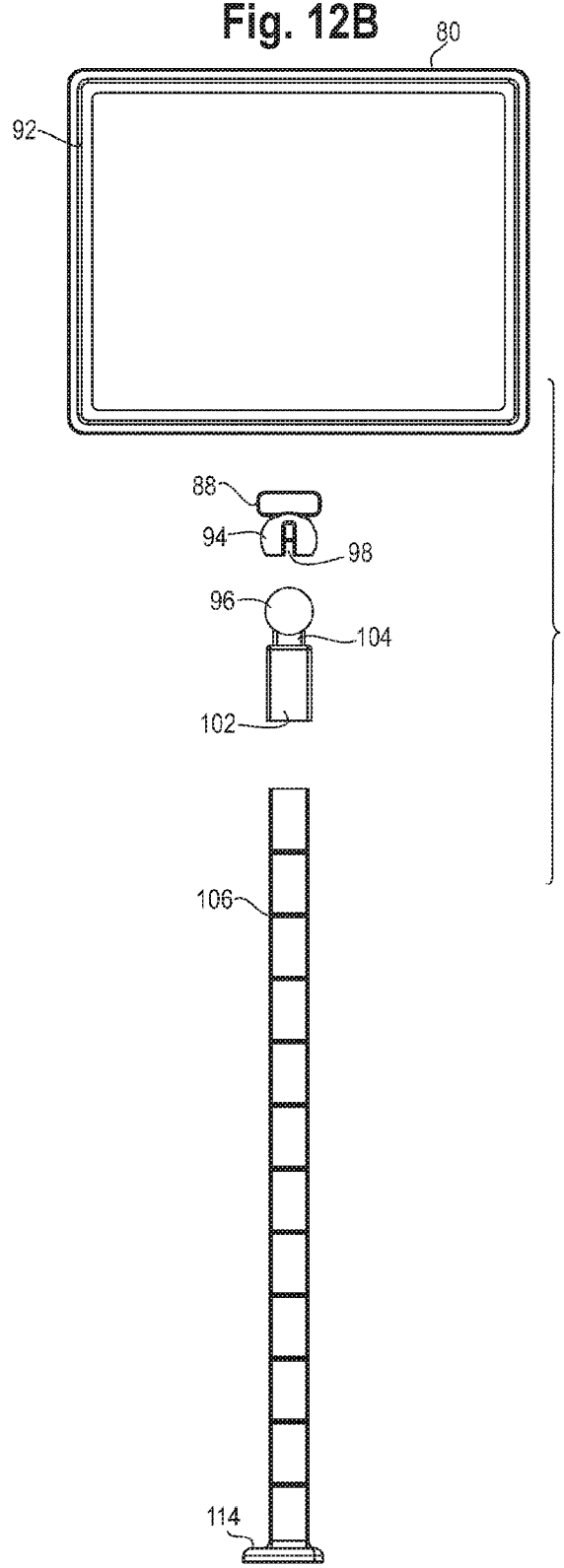
Fig. 12A
Fig. 12B

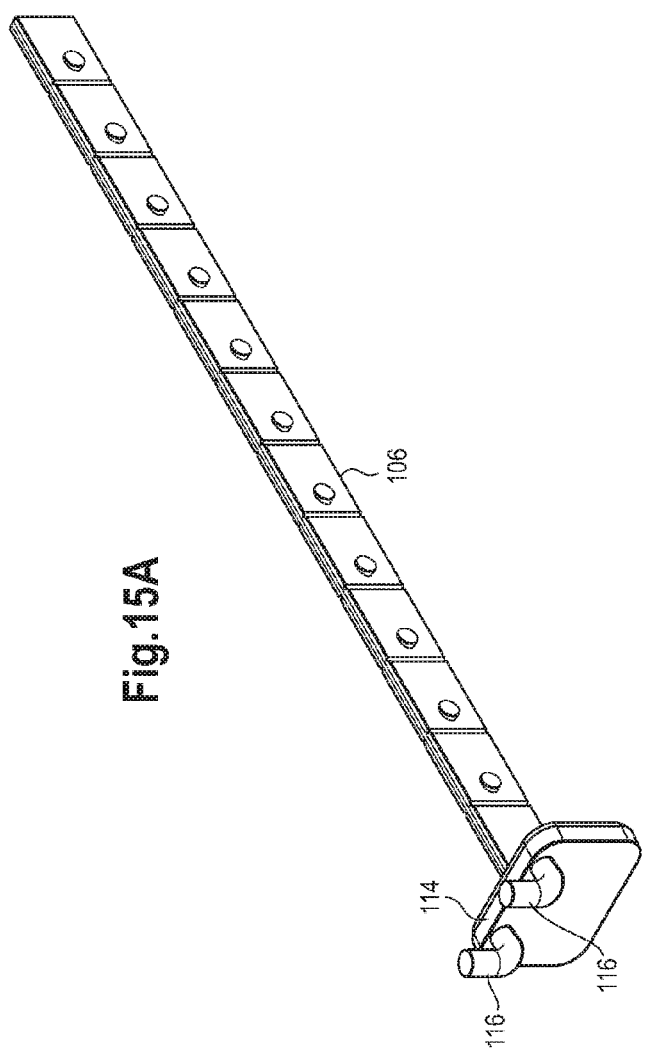
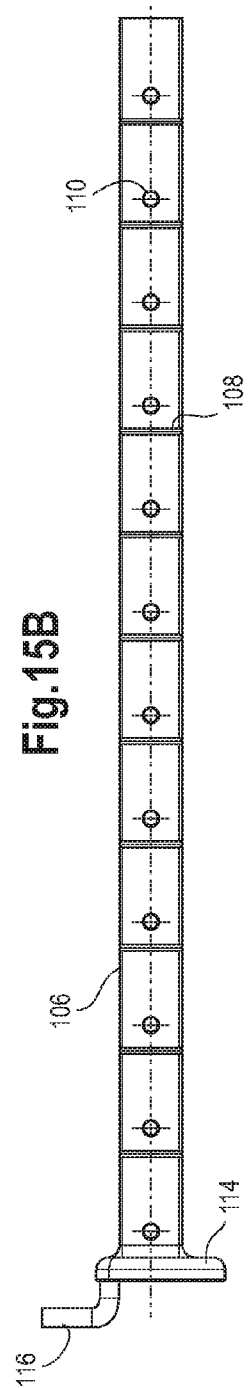
Fig.15A
Fig.15B

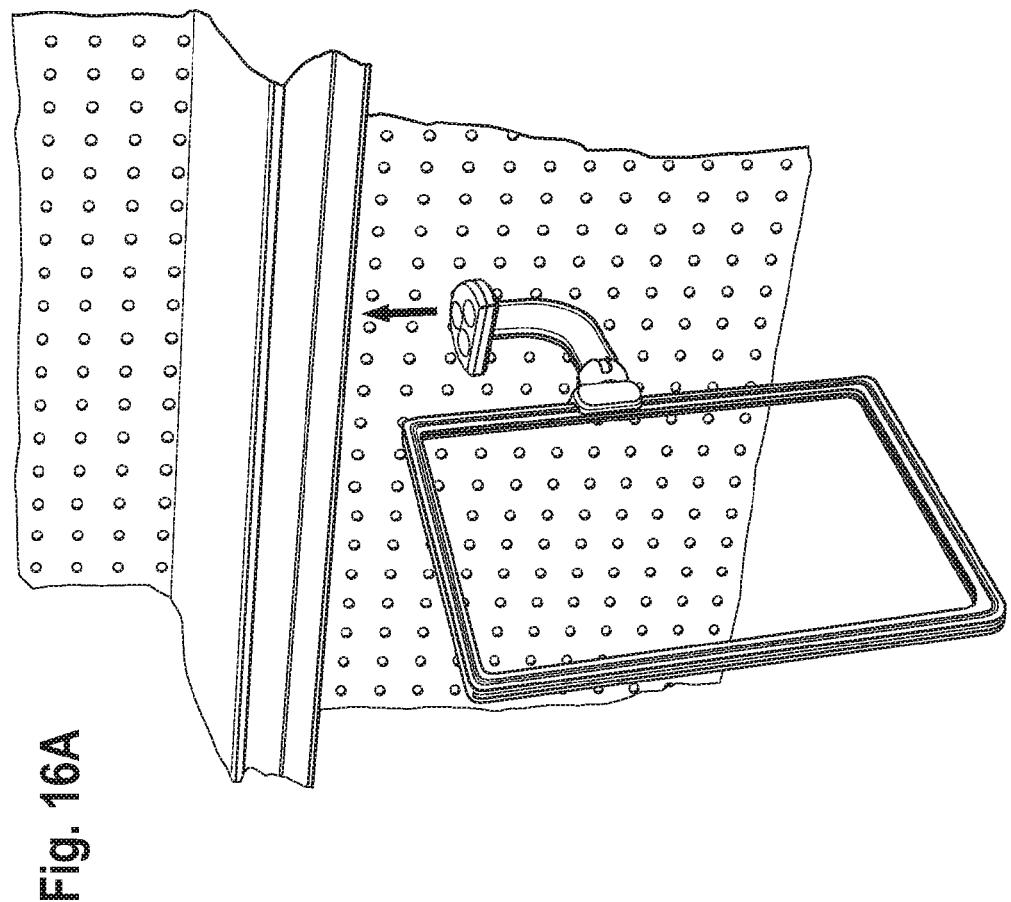

SHELF DISPLAY

PRIORITY

The application is a continuation-in-part of U.S. Ser. No. 14/710,890 filed May 13, 2015 which claims priority to Provisional Application No. 61/996,682 filed May 14, 2014.

BACKGROUND

The invention relates generally to advertising devices and more particularly to point-of-purchase shelf displays.

Marketers are always looking for ways to gain a consumer's attention. Retail establishments use a variety of displays to present products, coupons or information about products to consumers in order to encourage the consumer to make a purchase. One technique is known as a point-of-purchase display, where information about a product is located on a shelf or merchandising fixture close to where the product is available for purchase. Locating the display at the point where a customer is making a decision on whether or not to purchase a product can be a highly effective way to drive product sales.

Prior art displays suffer from a variety of drawbacks. Some are installed flat against the merchandising fixture and can be easily missed by consumers traveling through a store. Others have cumbersome installation techniques that require extra time on the part of store employees to install. Others are difficult to update with new advertising materials.

Thus, a need exists for point-of-purchase shelf displays that attract a consumer's attention and are easy to install and maintain.

SUMMARY

The invention in one implementation encompasses an apparatus. The apparatus comprises a point-of-purchase shelf display fixture that is easily attached to a store merchandising fixture in a retail or wholesale environment. It can be placed in many different orientations through the use of a ball joint and a sliding clip attached to a frame. The display may be formed in multiple sizes and shapes, and is oriented so that both sides of the shelf display can be used for graphic statements. This type of display is also known as an aisle violator or aisle invader because it extends from a merchandising fixture, or gondola, into the aisle.

In an embodiment, the shelf display fixture is attached magnetically so it can be quickly installed on a wide variety of shelving units without the use of extra hardware or tools. The magnetic attachment mechanism allows the fixture to be easily installed and repositioned. In the inventive shelf display, ads and graphics are also easy to interchange and update as needed.

Advantageously, the shelf display fixture is provided with several configurations of LED that further attract consumers' attention as they approach the product. The LEDs may be activated by motion sensors to conserve energy and save battery life.

In an embodiment, a shelf display according to the present invention includes first and second substantially planar frames each having an inner edge and an outer edge, said inner edge forming an opening in each of said frames, sidewalls integrally formed with and perpendicular to the first and second frames, said sidewalls attaching the first and second frames to each other on approximately three quarters of the outer edges of said frames so that the frames are held at a distance from each other of approximately 0.15 to 0.4 inches, the remainder of the outer edges forming a slot for insertion of graphic material, an arm flexibly attached to any sidewall by a ball joint and clip arrangement, a mounting assembly integrally formed with and attached to the opposite end of the arm, said mounting assembly further comprising a planar shape disposed perpendicularly to the length of the arm and one or more rare earth magnets attached to the mounting assembly, whereby the shelf display is attached to a merchandising fixture.

In a further embodiment, the invention encompasses an aisle violator display assembly for attachment to an existing merchandising fixture having horizontal shelves and vertical supports, which includes first and second rectangular frames each having an inner edge and an outer edge, said inner edge forming an opening in each of said frames, sidewalls integrally formed with and perpendicular to the first and second frames, said sidewalls attaching the first and second frames to each other on three sides of the outer edges of said frames so that the frames are held at a distance from each other of approximately 0.15 to 0.4 inches, the remaining side of the outer edges forming a slot for insertion of graphic material, an arm flexibly attached to any sidewall by a clip and ball joint arrangement, a mounting assembly integrally formed with and attached to the opposite end of the arm, said mounting assembly further comprising a planar shape disposed perpendicularly to the length of the arm and one or more rare earth magnets attached to the mounting assembly, whereby the aisle violator display assembly is attached to either horizontal shelves or vertical supports of the merchandising fixture.

In either of the above embodiments, a generally C-shaped slot is formed by the attachment of the sidewalls and first and second frames adjacent to the slot and extending to edge of the frames opposite the slot so that graphic material is retained between the frames.

In either of the above embodiments, the plane of the mounting assembly may be horizontal and equivalent to the plane of a shelf of the merchandising fixture, and wherein the one or more rare earth magnets attach to an underside of the shelf.

In a further embodiment, the graphic material is visible through the openings in both of the first and second frames. One or more LEDs may be incorporated in said frame or graphic material, said one or more LEDs may be activated by a motion sensor.

In either of the above embodiments, the arm is less than 1" long and is attached to a corner of said first and second frames, and wherein the plane of the mounting assembly is at an angle to the outer edges of the frame so that the shelf display rests on top of a merchandising fixture.

DESCRIPTION OF THE DRAWINGS

Features of example implementations of the invention will become apparent from the description, the claims, and the accompanying drawings in which:

FIG. 1 is a perspective view of an exemplary shelf display fixture under one embodiment.

FIGS. 2A and 2B are side and front views of the shelf display fixture of FIG. 1.

FIG. 3 is a perspective view of an exemplary shelf display fixture in a further embodiment.

FIGS. 4A and 4B are side and front views of the shelf display fixture of FIG. 3.

FIGS. 5A and 5B are alternative embodiments of the shelf display fixture of FIG. 3.

FIG. 6 is a perspective view of an exemplary shelf display fixture in a further embodiment.

FIGS. 8A-8D are front, side, back and top views of the shelf display fixture of FIG. 7.

FIG. 12A is a perspective view of an exemplary shelf display in a further embodiment.

FIG. 12B is a side view of the shelf display of FIG. 12A.

FIGS. 15A-15B depict an alternative mounting assembly for use with any of the disclosed shelf displays.

FIGS. 16A-16C depict a shelf display attached to a merchandising fixture.

DETAILED DESCRIPTION

Figure 7:
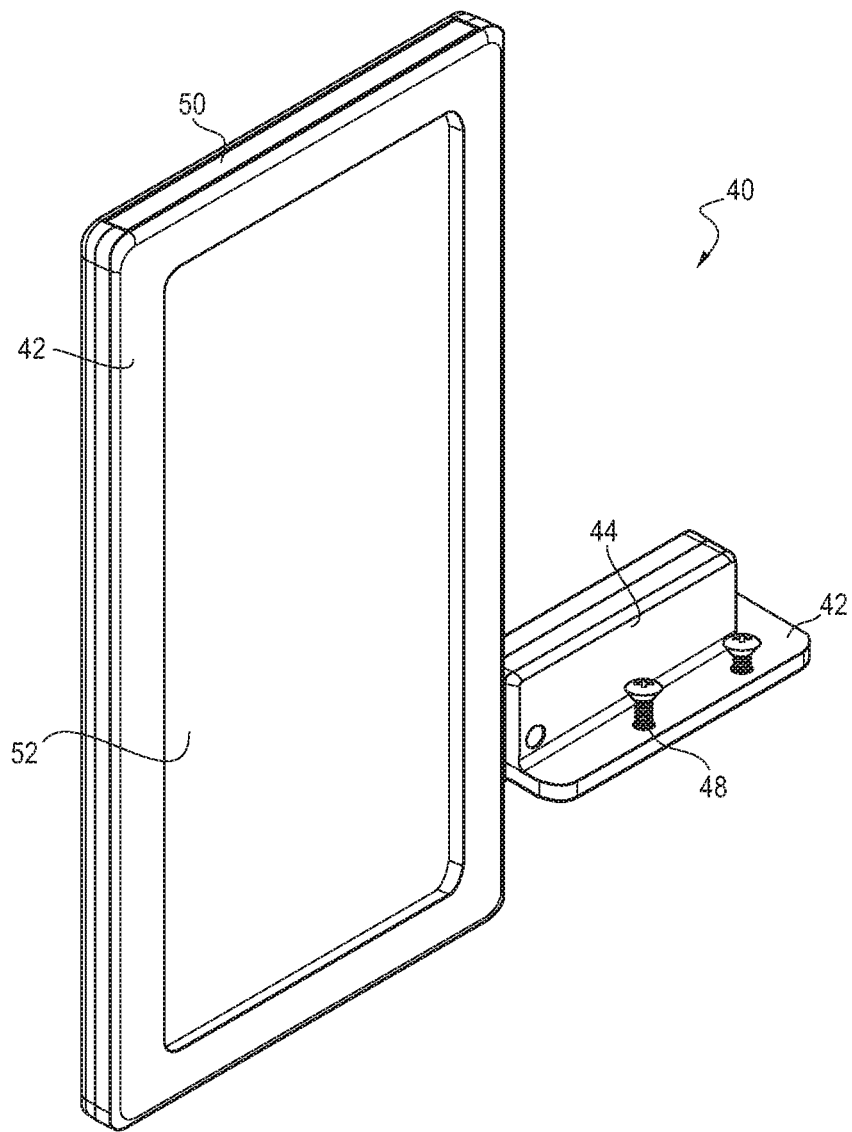
FIG. 7 is a perspective view of an exemplary shelf display fixture in another embodiment.

If used and unless otherwise stated, the terms "upper," "lower," "front," "back," "over," "under," and similar such terms are not to be construed as limiting the invention to a particular orientation. Instead, these terms are used only on a relative basis.

Turning to FIGS. 1 and 2A-2B, shelf display fixture 1 in a first embodiment of the invention includes a frame 2 and arm 4. Arm 4 is parallel to frame 2 and extends outwardly from one side of frame 2. Mounting assembly 6 extends from either side of arm 4. In an embodiment, frame 2, arm 4 and mounting assembly 6 are integrally formed, for example, using a process of injection molding, vacuum forming, etc. Suitable materials include, for example, ABS (acrylonitrile butadiene styrene) or other styrenes, polypropylene, polyurethane, polycarbonate, acrylic, etc. In an embodiment, shelf mounting assembly 6 includes one or more rare earth magnets, for example, neodymium magnets, attached to surface 8, enabling fixture 1 to be easily attached to the top of a wide variety of shelving units so that frame 2 extends perpendicularly away from the shelf. As an alternative, fixture 1 can be attached to a shelf using screws, pins, etc. This alternative is shown in more detail in FIG. 8. Frame 2 features a display area 10 that is visible from both sides of shelf display 1. Graphic material may be inserted into slot 11 on top of frame 2 and is visible from both sides of fixture 1. Alternatively, slot 11 may also be located on a side of frame 2 that is opposite arm 4. A generally C-shaped channel (not shown) extends along the inside length of each side of frame 2 so that graphic material inserted through slot 11 is held securely inside frame 2. If slot 11 is located in the side of frame 2, the C-shaped channel would extend along the top and bottom of frame 2.

In an embodiment, frame 2 has inside dimensions of approximately 13"×3.3" and outside dimensions of approximately 14.3"×5". Mounting assembly 6 is located approximately 7.5" below the top of frame 2 and the overall width of frame 2 and arm 4 together is approximately 6.3". The thickness of frame 2 is approximately 0.25". The above dimensions are representative and any desired dimensions that meet display, shelving or space requirements can be used.

In the embodiment shown in FIGS. 3 and 4A-4B, a shelf display fixture 12 includes a frame 14 and arm 16 which extends from one side in the same plane as frame 14. Mounting assembly 18 extends from either side of shelf arm 16. Frame 14, arm 16 and mounting assembly 18 are integrally formed as described above for the embodiment of FIG. 1. Surface 20 includes one or more recessed areas 24 for holding rare earth magnets, for example, neodymium magnets, (not shown) used to attach shelf display 12 to the underside of a shelf. Although three recessed areas 24 are shown, any desired number of magnets may be used. As an alternative, screws or pins could be used to attach shelf display fixture 12 to a shelf. A display area 22 is featured on both sides of fixture 12. Graphics are inserted into slot 26 which is shown on top of frame 14 but could also be located along the side of frame 14. As in the embodiment of FIGS. 1 and 2, this embodiment is preferably manufactured from, for example, ABS (acrylonitrile butadiene styrene) or other styrenes, polypropylene, polyurethane, polycarbonate, acrylic, etc.

In an embodiment, frame 14 has inside dimensions of approximately 4.25"×4.25" and outside dimensions of approximately 5"×5". Mounting assembly 18 is located approximately 1" below the top of frame 14 and the overall width of frame 14 and arm 16 is approximately 9". The thickness of frame 14 is approximately 0.20" and the thickness of mounting assembly 18 is approximately 1.3". The above dimensions are representative and any desired dimensions that meet display and space requirements can be used. For example, arm 16 could be located in any position along the side of frame 14.

An alternative embodiment of arm 16 of FIG. 3 is shown in FIG. 5A. In this embodiment, arm 16a extends perpendicularly from frame 14a. Mounting assembly 18a is attached vertically to the end of arm 16a opposite frame 14a. This embodiment allows a shelf display fixture to be attached to either horizontal or vertical portions of a merchandising fixture. The length of arm 16a may be adjusted to meet display, shelving or space requirements as needed. For example, in FIG. 5A, arm 16a is approximately 5" long. In FIG. 5B, arm 16b is approximately 9" long. Mounting assemblies 18a and 18b may also be attached to arms 16a and 16b in a variety of orientations, as shown. As for the other embodiments, the dimensions are representative and any desired dimensions that meet display and space requirements can be used. Arm 16a/16b can also be located in any position along the edge of frame 14a/14b.

In the embodiment of FIG. 6, a shelf display fixture 30 is mounted on top of shelf 31 similarly to shelf display fixture 1 of FIG. 1. Frame 32 holds graphics in display area 38, the graphics appearing on both sides of frame 32. Arm 36 is formed at a corner of frame 32 so that frame 32 forms an angle of approximately 15°-45° with shelf 31. As with shelf display fixture 1, mounting assembly 36 extends from either side of arm 36 and includes a surface 37 for holding rare earth magnets, for example, neodymium magnets (not shown), used to secure shelf display 30 to shelf 31. As an alternative, screws or pins could be used to attach shelf display fixture 30 to shelf 31. Fixture 30 has dimensions of approximately 5"×5" but any desired dimensions that meet display and space requirements can be used. As in the embodiment of FIGS. 1 and 3, this embodiment is preferably manufactured, for example, using a process of injection molding, vacuum forming, etc. Suitable materials include ABS (acrylonitrile butadiene styrene) or other styrenes, polypropylene, polyurethane, polycarbonate, acrylic, etc. In addition, a different mounting mechanism could be used.

In the embodiment of FIGS. 7 and 8A-8D, a shelf display fixture 40 includes frame 42 and arm 44. Mounting assembly 46 extends from either side of arm 44 and includes one or more screws 48 to attach fixture 40 to the top surface of a shelf. As an alternative, fixture 40 could be attached to a shelf using magnets as described for the embodiments of FIGS. 1, 3 and 6. The top of frame 42 includes a slot 50 for sliding graphics into frame 42 for display in the area marked as 52. In an alternative, slot 50 could be located along the side of frame 42. Graphic material can be displayed on both sides of fixture 40. As described above, this embodiment is preferably manufactured, for example, using a process of injection molding, vacuum forming, etc. Suitable materials include ABS (acrylonitrile butadiene styrene) or other styrenes, polypropylene, polyurethane, polycarbonate, acrylic, etc.

In an embodiment, frame 42 has inside dimensions of approximately 3"×7" and outside dimensions of approximately 4"×8". Mounting assembly 46 is approximately 2.75"×1.5". The thickness of frame 14 is approximately 0.50". The above dimensions are representative and any desired dimensions that meet display and space requirements can be used.

In a further embodiment, shelf display fixture 40 of FIG. 7 is used with a lighted display. In this embodiment, motion sensors 54 are included on one or both sides of arm 44 (as shown in FIGS. 8A and 8C). As an alternative, motion sensors 54 can also be located within frame 42.

Figure 9:
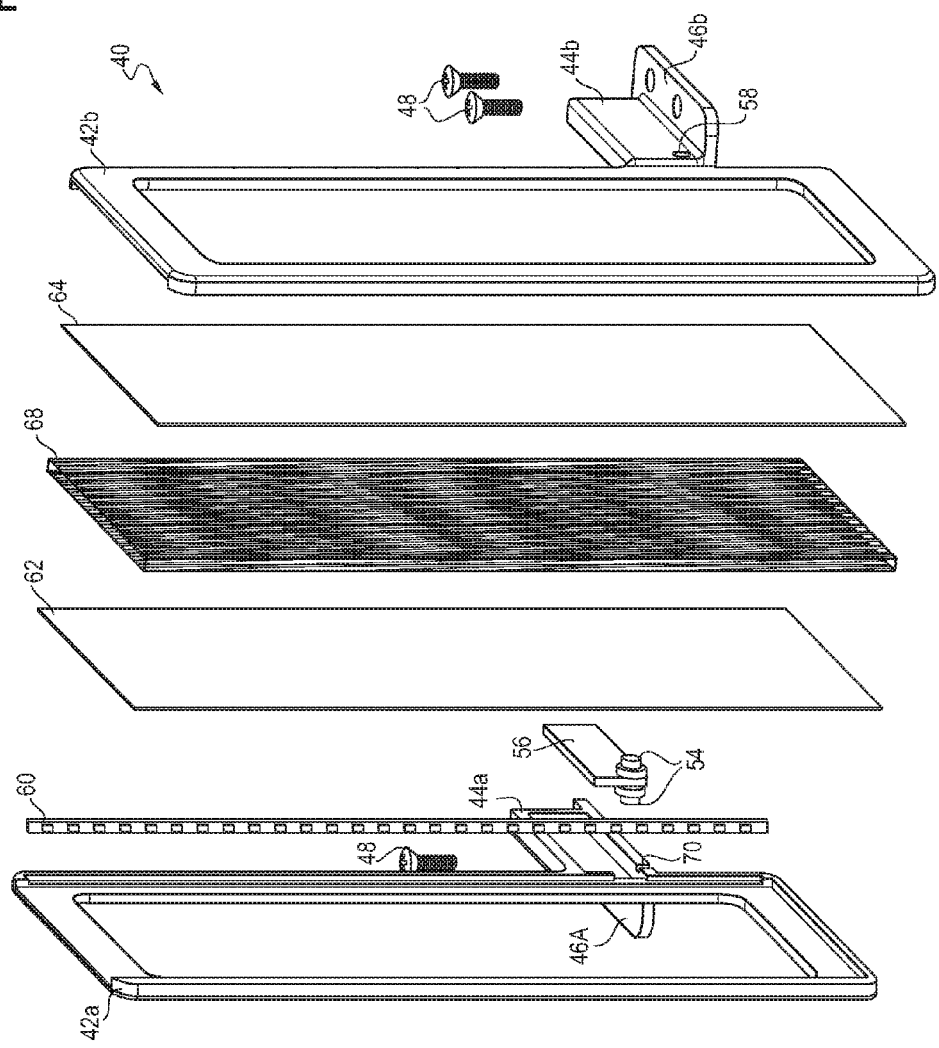
FIG. 9 is an exploded view of another embodiment of the shelf display fixture of FIG. 7.

A representative lighted display according to this embodiment is shown in an exploded view in FIG. 9. Frame 42 is shown in two halves at 42a and 42b, together with arm 44a, 44b and mounting assembly 46a, 46b. A strip of LEDs 60 is installed along one vertical edge of frame 42 for providing light to fixture 40. Translucent panels 62 and 64 printed with advertising graphics and are located next to frame 42a and 42b respectively. Grooved acrylic light refractor panel 68 is positioned between acrylic panels 62 and 64 to provide an even lighting of panels 62 and 64. Motion sensors 54 are held in place by tab 56 which fits into recessed areas of arm 44a, 44b. Motion sensors 54 are inserted through holes 58 when the shelf display is assembled. As mentioned above, motion sensors 54 can also be located in frame 42. A battery pack (not shown) connects to fixture 40 through an opening 70 in mounting assembly 46a, although any preferred location could be used. The battery pack connects to fixture 40 through wires of a length sufficient to allow the battery pack to be positioned away from the edge of a shelf. It can be mounted on the top or underside of a shelf, may use any desired size of battery and may also be provided with an on/off switch as required.

LEDs 60 and light refractor panel 68 are used interchangeably with multiple translucent panels 62 and 64 so that advertising graphics can be changed as required. In an alternative embodiment, fixture 40 is provided with an audio component, for example, a speaker, to further attract a consumer's attention to the displayed graphic. A speaker could be installed in fixture 40 of FIG. 9 in a manner similar to that of motion sensors 54.

Figure 10:
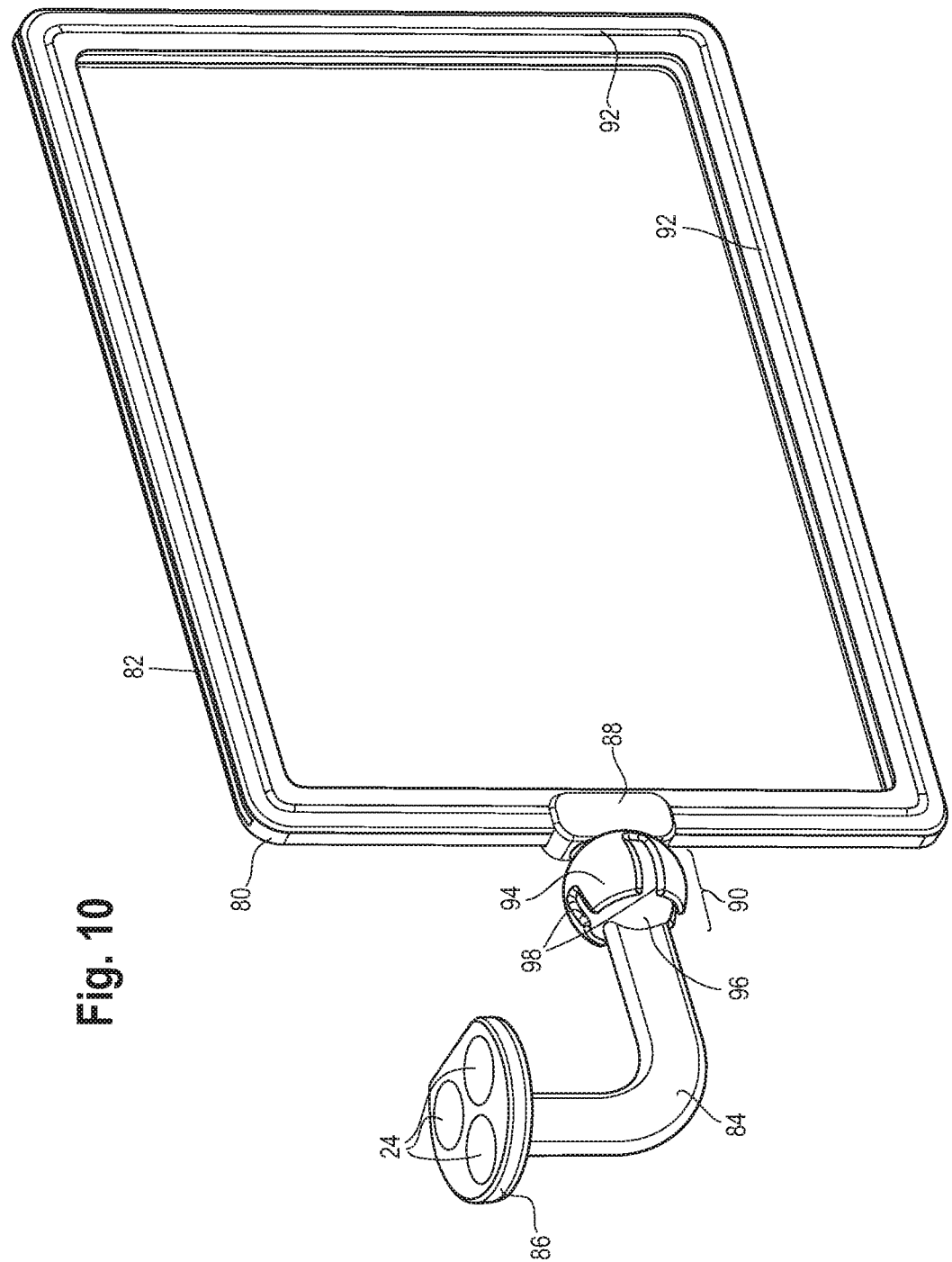
FIG. 10 is a perspective view of an exemplary shelf display fixture in another embodiment.

In the embodiment of FIG. 10, a display frame 72 is attached to sliding clip 74 so that sliding clip 74 slides along an edge of display frame 72. Clip 74 and frame 72 are designed with a certain amount of friction between them, such that clip 74 will easily slide along frame 74, but will retain frame 74 any location along the edge of frame 74 so as so meet specific display needs.

Another embodiment of the invention is shown in FIG. 10. Similar to that of FIG. 3, this embodiment includes a frame 80 having a slot 82 for inserting graphic material. Arm 84 connects frame 80 to mounting assembly 86 which includes recessed areas 24 for receiving magnets, as explained above for FIG. 3. In this embodiment, instead of integrally forming arm 84 with frame 80, arm 84 is attached by means of frame clip 88 and ball joint 90. Frame clip 88 snaps onto frame 80 such that a recessed area inside frame clip 88 engages with ridge 92 of frame 80, shown in more detail in FIG. 11A. Frame clip 88 slides freely along the edge of frame 80, however frame claim 88 and frame 80 are designed with a certain amount of friction between them, such that clip 88 can be moved along frame 80 but will retain it at any location along the edge of frame 80 so as to meet specific display needs. Although frame clip 88 is shown in FIG. 10 as located on a particular side of frame 80, it can also be snapped onto any of the other three edges of the frame since ridge 92 extends all the way around the edge of frame 80.

Ball joint 90 includes semispherical ball cup 94, which snaps onto ball 96. Ball cup 94 is integrally formed with frame clip 88. Ball cup 94 rotates freely on ball 96, which is integrally formed with arm 84. Ball cup 94 can be retained in a variety of orientations by engaging notches 98 with arm 84. Although the ball joint attachment mechanism of FIG. 10 is shown with an under shelf magnetic mounting assembly, one of ordinary skill in the art would understand that the ball joint could be used with any of the disclosed embodiments.

Figure 11:
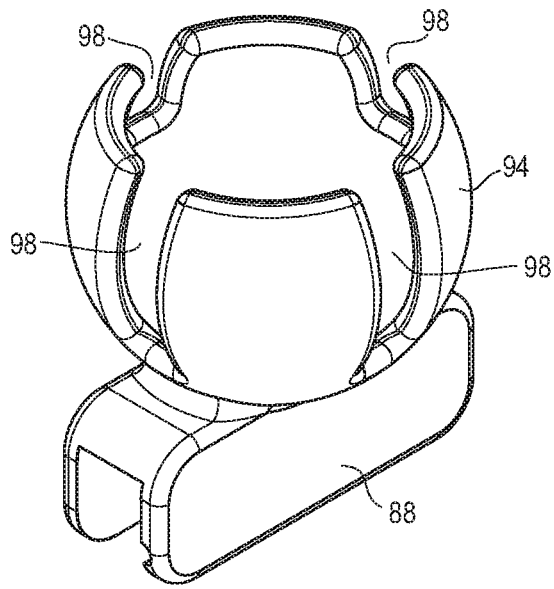
FIG. 11 is close-up perspective view of the ball cup and clip of FIG. 10.
Figure 11A:
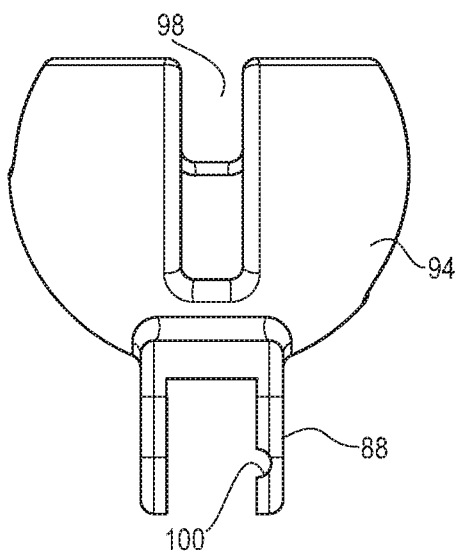
FIG. 11A is a side view of the ball cup and clip of FIG. 11.

A closer view of ball cup 94 and frame clip 88 is shown in FIGS. 11 and 11A. Ball cup 94 includes notches 98 for engaging with arm 84 of FIG. 10. Although four notches are shown, any number and depth of notches could be used a necessary to meet structural and display requirements. A side view is shown in FIG. 11A. In particular, frame clip 88 includes recessed area 100 which engages with ridge 92 on frame 80.

A further embodiment of the invention is shown in perspective view in FIG. 12A and exploded side view in FIG. 12B. Clip 88 is attached to ball cup 94 and snaps onto frame 80 as explained above. In this embodiment, however, ball 96, instead of being integrally formed with an arm of the shelf display, is attached to arm clip 102. As shown in FIG. 12A, ball 94 is attached to arm clip 102 by neck 104. Neck 104 has a similar size and profile to arm 84 of FIG. 10, so as to engage slots 98 in ball cup 94.

In both FIGS. 12A and 12B, arm clip 102 snaps onto an end of arm 106. Arm 106 is divided into segments by breakaway lines 108. The length of arm 106 can easily be adjusted by snapping off a portion of arm 106 at any of the breakaway lines 108. In an embodiment, breakaway lines 106 are spaced approximately an inch apart along the length of arm 106 but any appropriate spacing could be used.

Each section of arm 106 features a locking pin 110 which engages with pin receiver 112 in arm clip 102 as discussed below. Mounting assembly 114 is located at the end of arm 106 opposite arm clip 102. In a preferred embodiment, mounting assembly 114 is fitted with magnets as discussed above for mounting assembly 18 of FIG. 3. It could also be attached to a merchandising fixture with screws, as described above.

In a preferred embodiment, display frame 80 is approximately 7 by 5.5 inches. Arm 106 has an initial length of approximately 12 inches, with breakaway lines approximately every inch spaced evenly along arm 106. These dimensions are representative and any desired dimensions that meet display and space requirements can be used.

Figure 13:
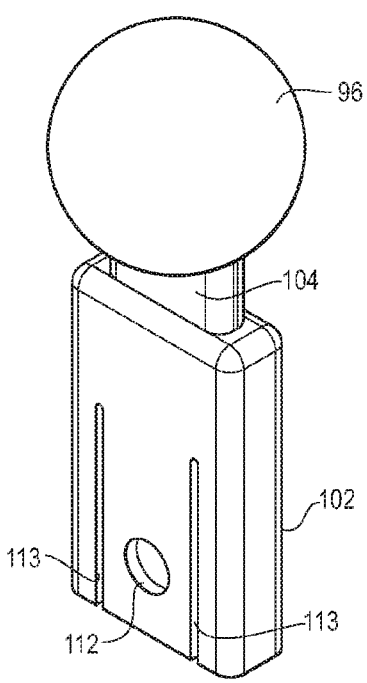
FIG. 13 is a perspective view of the ball and arm clip of FIG. 12A.
Figure 13B:
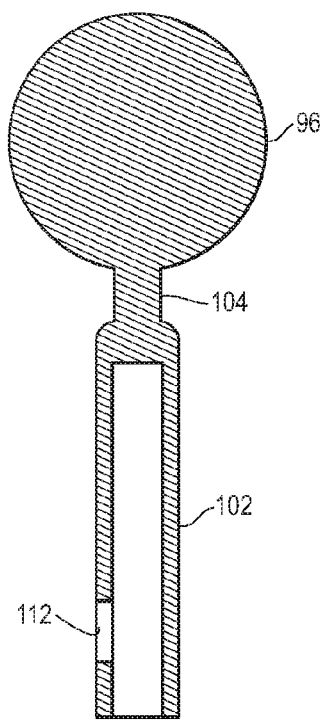
FIGS. 13B-13C are cross-sectional views of the ball and arm clip of FIG. 13A.
Figure 13A:
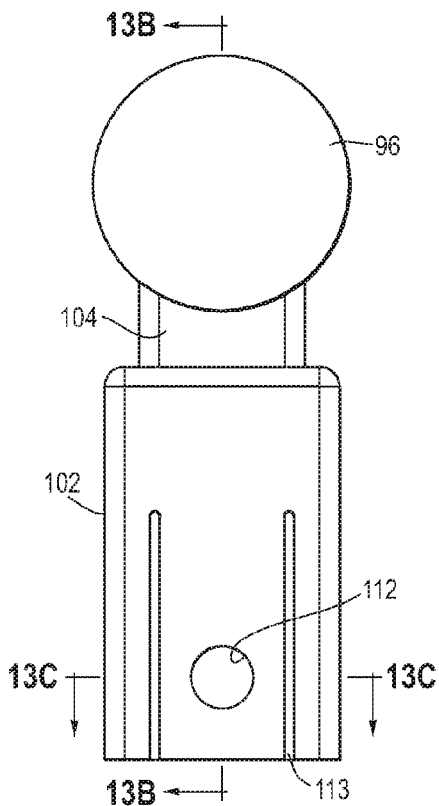
FIG. 13A is a side view of the ball and arm clip of FIG. 13.
Figure 13C:
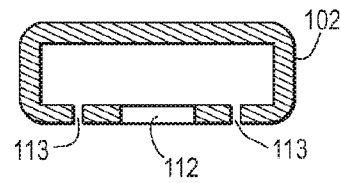

A close up view of ball 96 and arm clip 102 is shown in perspective view in FIG. 13. Ball 96 is attached to arm clip 102 by neck 104. Arm clip 102 further includes pin receiver 112 and slots 113, which allow arm clip 102 to flexibly slide over locking pin 110 as explained below. A side view is shown in FIG. 13A, and cross-sectional views are shown in FIGS. 13B and 13C.

Figure 14A:
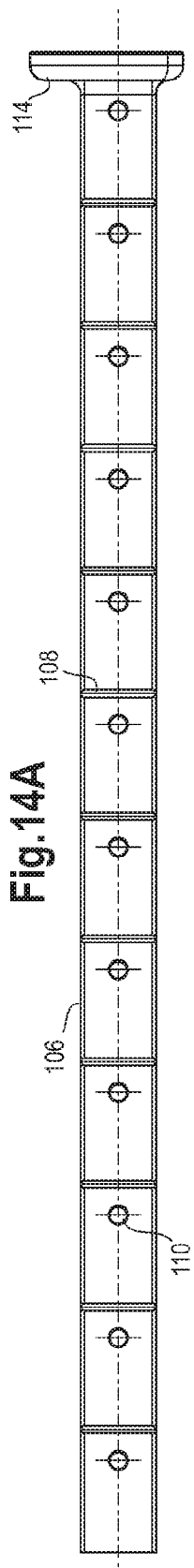
FIGS. 14A-14C show additional views of the arm of FIGS. 12A-12B.
Figure 14B:
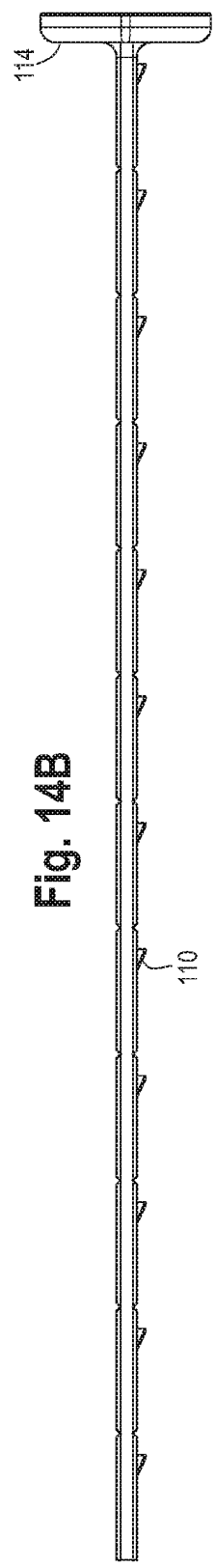
Figure 14C:
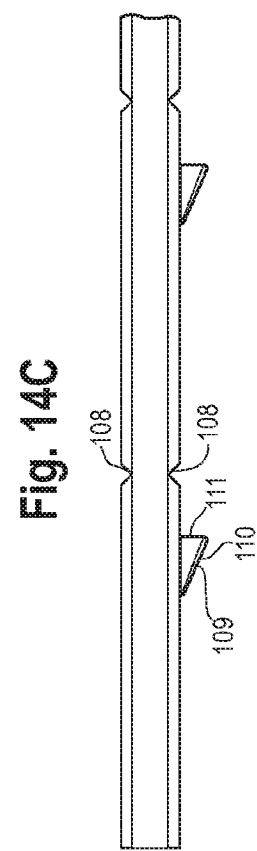

FIGS. 14A-14C show additional views of arm 106 of FIGS. 12A and 12B. FIG. 14A shows a front view of arm 106, including locking pins 110, breakaway lines 108 and mounting assembly 114. In the side view of FIG. 14B, locking pins 110 can be seen as projecting outwardly from arm 106. A close up view of FIG. 14B is shown in FIG. 14C. Breakaway lines 108 are small indentations on the front and back of arm 106. Locking pins 110 include a slanted surface 109 so that arm clip 102 easily slides over locking pin 110. Pin receiver 112 in arm clip 102 engages with vertical surface 111.

FIG. 15A depicts an arm 106 with an alternative mounting assembly for use with any of the disclosed shelf displays. Mounting assembly 114 is designed for use with a peg board type of display, where pins 116, shown in side view in FIG. 15B, engage with holes in a peg board. Arm 106 of FIGS. 15A and 15B optionally includes breakaway lines 108 so that the length of arm 106 can be easily changed, as well as locking pins 110 for engaging with arm clip 102 as shown in FIGS. 14A-14C.

As in the embodiment of FIGS. 1 and 2, the embodiments of FIGS. 10-15 are preferably manufactured from, for example, ABS (acrylonitrile butadiene styrene) or other styrenes, polypropylene, polyurethane, polycarbonate, acrylic, etc.

Figure 16B:
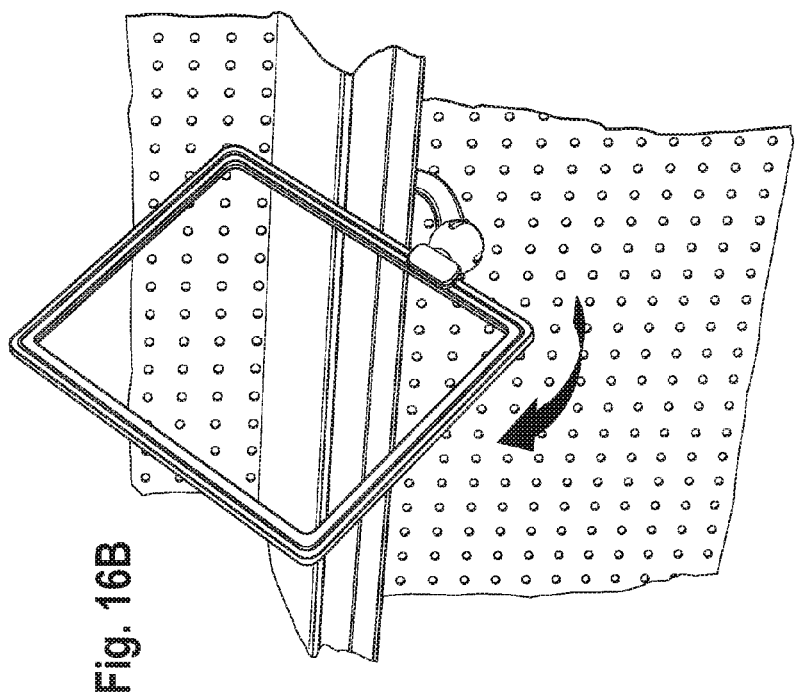
Figure 16C:
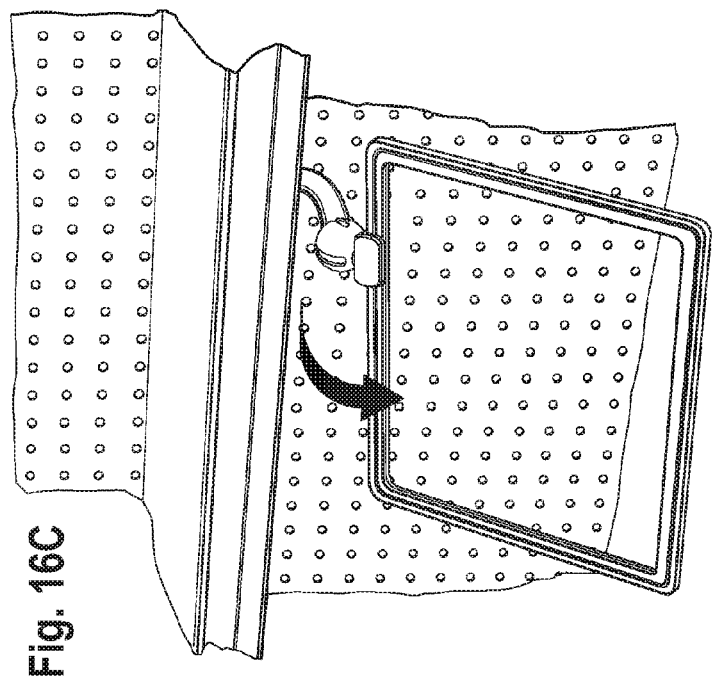

The ball joint of the invention provides a very flexible way to install and position a shelf display or aisle violator. As shown in FIG. 16A, a shelf display may be installed under a shelf of a merchandising fixture as indicated by the arrow. FIG. 16B depicts the shelf display tilted at an angle to the shelf using the ball joint as indicated by the arrow. The clip on the edge of the frame may also be positioned anywhere along the frame as discussed above. FIG. 16C depicts the shelf display swiveled to extend downward from the merchandising fixture at an angle, as indicated by the arrow. These are just three representative positions of the shelf display for illustration purposes, an almost infinite variety of positions are possible. The ball joint may also be used with different mounting assemblies, as well.

The graphic material, or advertising content, displayed in any of the frames of the present invention may take a variety of forms. The graphic material may be printed in paper, cardstock or something similar. One or more steady-state or flashing LEDs, which may also be motion-activated, may be attached to the graphic material. Further, graphic material incorporating lenticular printing, where the image changes based on viewing angle, may also be used. Graphic content for the frames of the invention may also be provided by a programmable digital display inserted into or integrally formed with any of the frames.

The installation of any of the shelf display fixtures described above is quick and convenient. Fixtures using a magnetic method of attachment are installed by simply inserting suitable graphics into the slot in the frame and setting the fixture in a preferred location on a shelf. Shelf displays according to the present invention offer a large degree of flexibility and do not require the use of tools to install. They are easily repositioned and reused as needed. Embodiments using screws or other means of attachment are similarly installed.

Numerous alternative implementations of the present invention exist. For example, the dimensions and shapes of the various embodiments of the shelf display fixtures can be varied according to display needs, space available and customer preference. Also, the method of attaching the shelf display fixtures to a shelf can be varied to adapt to different kinds of shelves. Additionally, LEDs can be used in any of the frames of the various embodiments for further attract attention, as well as in the inserted graphics themselves. LEDs may be motion activated, steady state or blinking, and powered by a watch battery or any preferred power source. Any preferred method of printing or developing graphics on paper-based or acrylic-based media can be used. In another alternative, any of the frames above may be molded to include an imprint of a brand identity or other information.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A shelf display for attachment to a merchandising fixture, the shelf display comprising:
   a display frame for retaining and displaying graphic material, said display frame having a plurality of edges;
   an arm for attaching the display frame to a merchandising fixture, said arm further comprising:
      a mounting assembly integrally formed with an end of the arm, said mounting assembly further comprising a planar shape disposed perpendicularly to the length of the arm; and
      a plurality of segments defined by breakaway lines spaced evenly along its length so that the arm can be shortened by snapping off a portion of the arm along a breakaway line; and
   a ball joint mechanism for flexibly attaching an end of the arm opposite the mounting assembly to the display frame, the ball joint mechanism further comprising:
      a first clip for slideably engaging an edge of the display frame;
      a socket integrally formed with the clip;
      a ball for flexibly engaging with the socket; and
      a second clip integrally formed with the ball for attaching the ball joint mechanism to the arm.

2. The shelf display of claim 1, wherein each segment of the arm includes a locking pin that engages with a hole in the second clip.

3. The shelf display of claim 1, wherein the length of the arm is less than approximately 12" long.

4. The shelf display of claim 1, wherein the mounting assembly further comprises one or more rare earth magnets for attaching the shelf display to a shelf of said merchandising fixture.

5. The shelf display of claim 1, wherein the mounting assembly further comprises pegs for engaging with holes on a peg board.

6. The shelf display of claim 1 wherein the display frame retains graphic material for products on the merchandising fixture.

7. A shelf display for attachment to a merchandising fixture, the shelf display comprising:

a display frame for retaining and displaying graphic material, said display frame further comprising first and second substantially planar frames each having an inner edge and an outer edge, said inner edge forming an opening in each of said frames; and at least one of said first and second planar frames further comprising a ridge around the opening in the frame, between the inner and outer edges of the frame; and a first clip for slideably engaging the display frame, said first clip further comprising a recessed area for slideably engaging the ridge so that the first clip is positionable at any location along the outer edge of the display frame;

a socket integrally formed with the clip;

an arm for attaching the display frame to a merchandising fixture, said arm further comprising:

a mounting assembly integrally formed with an end of the arm, said mounting assembly further comprising a planar shape disposed perpendicularly to the length of the arm; and a ball integrally formed with the opposite end of the arm from the mounting assembly, said ball flexibly engaging with the socket.

8. The shelf display of claim 7, wherein the length of the arm extends perpendicularly away from the display frame.

9. The shelf display of claim 7, wherein the arm is curved.

10. The shelf display of claim 7 wherein the display frame retains graphic material for products on the merchandising fixture.

11. The shelf display of claim 7, wherein the mounting assembly further comprises pegs for engaging with holes on a peg board.

12. The shelf display of claim 7, wherein the socket further comprises a semispherical ball cup.

13. The shelf display of claim 12, wherein the socket further comprises a plurality of notches for retaining the arm when the ball is engaged with the socket.

14. The shelf display of claim 7, wherein the mounting assembly further comprises one or more rare earth magnets for attaching the shelf display to a shelf of said merchandising fixture.

* * * * *